(12) United States Patent
Deichmann et al.

(10) Patent No.: US 11,802,528 B2
(45) Date of Patent: Oct. 31, 2023

(54) FUEL DELIVERY ASSEMBLY AND FUEL DELIVERY UNIT

(71) Applicant: Vitesco Technologies GmbH, Hannover (DE)

(72) Inventors: Johannes Deichmann, Munich (DE); Dirk Becker, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 144 days.

(21) Appl. No.: 17/416,589

(22) PCT Filed: Dec. 13, 2019

(86) PCT No.: PCT/EP2019/085200
§ 371 (c)(1),
(2) Date: Jun. 21, 2021

(87) PCT Pub. No.: WO2020/126947
PCT Pub. Date: Jun. 25, 2020

(65) Prior Publication Data
US 2022/0056873 A1    Feb. 24, 2022

(30) Foreign Application Priority Data
Dec. 20, 2018   (DE) ..................... 10 2018 222 564.8

(51) Int. Cl.
*F02M 37/08*   (2006.01)
*F04D 13/06*   (2006.01)
(Continued)

(52) U.S. Cl.
CPC ............ *F02M 37/08* (2013.01); *F04D 13/06* (2013.01); *H02K 1/185* (2013.01); *H02K 7/04* (2013.01)

(58) Field of Classification Search
CPC .............. F04C 2240/40; F04C 2240/30; F04C 11/008; F04C 2210/1044; F04C 2/102;
(Continued)

(56) References Cited

U.S. PATENT DOCUMENTS 3,969,044 A * 7/1976 Fussner ................. F04C 11/008
                                                      417/366
5,015,519 A    5/1991 Yumoto
(Continued)

FOREIGN PATENT DOCUMENTS

CN          1676915         10/2005
EP          2894766          7/2015
(Continued)

OTHER PUBLICATIONS

Office Action of the corresponding German Patent Application No. 10 2018 222 564.8.
(Continued)

*Primary Examiner* — Dominick L Plakkoottam
(74) *Attorney, Agent, or Firm* — Cozen O'Connor

(57) ABSTRACT

A fuel delivery assembly has a sheet-metal casing that sealingly encloses an electric motor and a pump by rolling, a suction-side inlet opening, and a pressure-side outlet opening. The electric motor has a first stator and a rotor, the first stator is provided with a plastic extrusion coating which forms a ring running in encircling fashion between the first stator and the pump. A fuel delivery unit for use in a fuel tank of a vehicle, having a fuel delivery assembly and having a surge tank in which the fuel delivery assembly is arranged in order to deliver fuel from the surge tank to an internal combustion engine.

11 Claims, 5 Drawing Sheets

(51) Int. Cl.
*H02K 1/18* (2006.01)
*H02K 7/04* (2006.01)

(58) Field of Classification Search
CPC .. F04C 2/16; F04C 2230/60; F04C 2230/603;
F04C 2240/20; H02K 5/12; H02K 7/14;
H02K 1/185; H02K 15/14; H02K 16/00;
H02K 5/04; H02K 5/08; H02K 5/132;
H02K 5/203; F02M 37/08; F02M
37/0017; F02M 37/048; F02M 37/10;
F02M 37/106
See application file for complete search history.

(56) References Cited

U.S. PATENT DOCUMENTS

| | | | | |
|---|---|---|---|---|
| 6,231,318 B1 * | 5/2001 | Cotton | ............... | F02M 37/10 |
| | | | | 415/55.1 |
| 6,497,201 B1 * | 12/2002 | Werson | ............... | F04D 13/12 |
| | | | | 123/41.12 |
| 11,499,548 B2 * | 11/2022 | Hinrichs | ............... | F04C 11/008 |
| 2005/0220641 A1 * | 10/2005 | Nagata | ............... | F02M 37/10 |
| | | | | 417/423.3 |
| 2007/0176511 A1 * | 8/2007 | Sakai | ............... | H02K 1/148 |
| | | | | 310/87 |
| 2010/0034674 A1 * | 2/2010 | Oota | ............... | H02K 7/14 |
| | | | | 310/58 |
| 2017/0070106 A1 * | 3/2017 | Guo | ............... | H02K 1/12 |
| 2018/0258893 A1 * | 9/2018 | Fischer | ............... | F02M 37/106 |

FOREIGN PATENT DOCUMENTS

| | | |
|---|---|---|
| JP | 2017200279 | 11/2017 |
| KR | 20170018992 | 2/2017 |
| WO | WO 2018073008 | 4/2018 |

OTHER PUBLICATIONS

Office Action dated Jun. 27, 2022 issued in Chinese Patent Application No. 201980084259.X.

* cited by examiner

FUEL DELIVERY ASSEMBLY AND FUEL DELIVERY UNIT

CROSS REFERENCE TO RELATED APPLICATIONS

This is a U.S. national stage of Application No. PCT/EP2019/085200 filed Dec. 13, 2019. Priority is claimed on German Application No. DE 10 2018 222 564.8 filed Dec. 20, 2018 the content of which is incorporated herein by reference.

BACKGROUND OF THE INVENTION

1. Field of the Invention

The present disclosure relates to a fuel delivery assembly and a fuel delivery unit, comprising such a fuel delivery assembly, for use in vehicles.

2. Description of Related Art

The fuel delivery assembly is to be understood to mean, in particular, an assembly for conveying liquid fuel, in particular for use in a vehicle.
A vehicle is to be understood to mean any type of vehicle operated with a liquid fuel. Furthermore, the vehicle may also be a vehicle which is operated partially with a gaseous fuel and/or which is operated partially electrically. The vehicle may in particular be a passenger motor vehicle and/or a utility vehicle.

SUMMARY OF THE INVENTION

One aspect of the present invention is a fuel delivery assembly in the case of which it is sought for differences in length of a stator of an electric motor, which result from differences in the thickness of individual laminations, arranged one behind the other, of a laminated core of the stator, to be compensated and for misalignments between an electric motor and a pump of the fuel delivery assembly to be reduced.

One aspect of the invention is a fuel delivery assembly, having a sheet-metal casing that sealingly encloses an electric motor and a pump by rolling, a suction-side inlet opening, and a pressure-side outlet opening, wherein the electric motor has a first stator and a rotor and the first stator is provided with a plastic extrusion coating that forms a ring running in encircling fashion between the first stator and the pump. During the injection molding of the plastic extrusion coating, it is possible in particular for a very low-viscosity plastic melt to flow between individual laminations of a laminated core of the first stator. The plastic extrusion coating consequently ensures a firm and reliable connection between the encircling ring and the individual laminations of the laminated core of the first stator. This reduces the risk of an undesired positional deviation between the electric motor and the pump connected thereto, such that an axial alignment of the electric motor and the pump is optimized. Furthermore, the plastic extrusion coating compensates for differences in a thickness of individual laminations, arranged one behind the other, of a laminated core of the first stator, because the overall length of a composite composed of the first stator and the ring injection-molded thereon is defined by the dimensions of a cavity of an injection molding tool. The differences in thickness between the laminations, arranged one behind the other, of the laminated core of the first stator therefore cannot influence the overall length of the composite owing to the ring injection-molded on. Owing to the defined total length of the composite, it is possible, in the case of rolling of the sealingly enclosing sheet-metal casing, to reproduce a rolling result that ensures the pressure-tightness of the fuel delivery assembly. In the case of rolling, an end region of the sheet-metal casing can be bent against a cover along a closed encircling rolling path, such that the cover is confined by the rolled sheet-metal casing and can no longer be detached therefrom. The cover that closes off the fuel delivery assembly and the rolled sheet-metal casing therefore remain reliably connected to one another during operation. The pressure-tightness of the fuel delivery assembly according to one aspect of the invention is thus ensured. Furthermore, an arcuate contour of the rolling path may have at least one flattening which, in the case of a circular rolling path, may be in the form of at least one circular-segment-shaped recess. In this way, the cover is prevented from rotating in an undesired manner relative to the sheet-metal casing.

According to one aspect of the invention, the fuel delivery assembly may also have a second stator, likewise provided with a plastic extrusion coating, which can be pushed into the first stator.

According to one aspect of the invention, three support knobs acting in a pump longitudinal direction may be attached to the encircling ring on the pump side. The three support knobs are preferably injection-molded onto the ring at a face side. They contribute to a statically determinate mounting of the pump housing on the ring, such that the pump housing and the ring lie against one another with maximum axial alignment without wobbling and the risk of jamming of a rotor that rotates in the second stator is minimized.

According to one aspect of the invention, the plastic extrusion coating of the second stator forms an inner lining of a bore that contributes to the centering of the pump housing in the second stator. The bore, which acts as a centering element, can accommodate forces acting radially therein. It consequently forms part of the statically determinate mounting of the pump housing.

According to one aspect of the invention, angular securing elements are provided to secure the first stator and/or the second stator relative to the pump housing at a particular angle. The angular securing elements likewise play a part in optimizing the statically determinate mounting between the pump housing and the ring. The statically determinate mounting between the ring and the pump housing maximizes the efficiency of the fuel delivery assembly and minimizes its noise emissions.

According to one aspect of the invention, the plastic extrusion coating may form the encircling ring at one end of the electric motor and also form a connection piece, which has a connector, at the other end of the electric motor. The encircling ring and the connection piece are thus formed as a single piece, such that assembly steps are saved in the manufacture of the fuel delivery assembly.

According to one aspect of the invention, the second stator may have at least one stop which, when the second stator is pushed into the first stator, abuts against the first stator. The stop may be in the form of a ring-shaped edge or may be produced by multiple ring-segment-shaped edge sections or by multiple detent-lug-like stop elements.

According to one aspect of the invention, the support knobs may be arranged adjacent to one another at an angle of 120°. The uniform distribution of the support knobs thus achieved likewise ensures that the ring and the pump housing are in contact with one another without wobbling.

According to one aspect of the invention, the pump may be a side-channel pump. The pump operates in a particularly energy-saving manner and with little noise emission. Alternatively, a gerotor pump, a roller cell pump, or a screw pump may also be used. The solution according to one aspect of the invention is thus suitable for an existing modular system that integrates various types of motors and pumps.

According to one aspect of the invention, a radial seal may be arranged between the connection piece and the sheet-metal casing. The radial seal is preferably an O-ring, which is provided at an end region situated opposite the rolled end of the sheet-metal housing in order to ensure the pressure-tightness of the fuel delivery assembly.

According to one aspect of the invention, the electric motor may be a brushless direct-current motor, which ensures a long service life for the fuel delivery assembly.

Also proposed is a fuel delivery unit for use in a fuel tank of a vehicle, having a fuel delivery assembly and having a surge tank in which the fuel delivery assembly is arranged in order to deliver fuel from the surge tank to an internal combustion engine.

BRIEF DESCRIPTION OF THE DRAWINGS

The invention will be explained in detail in the following text with reference to the illustrations in the figures. Further advantageous refinements of the invention will emerge from the dependent claims and the following detailed description of a proposed embodiment. In the figures:

DETAILED DESCRIPTION OF THE PRESENTLY PREFERRED EMBODIMENTS

Figure 1:
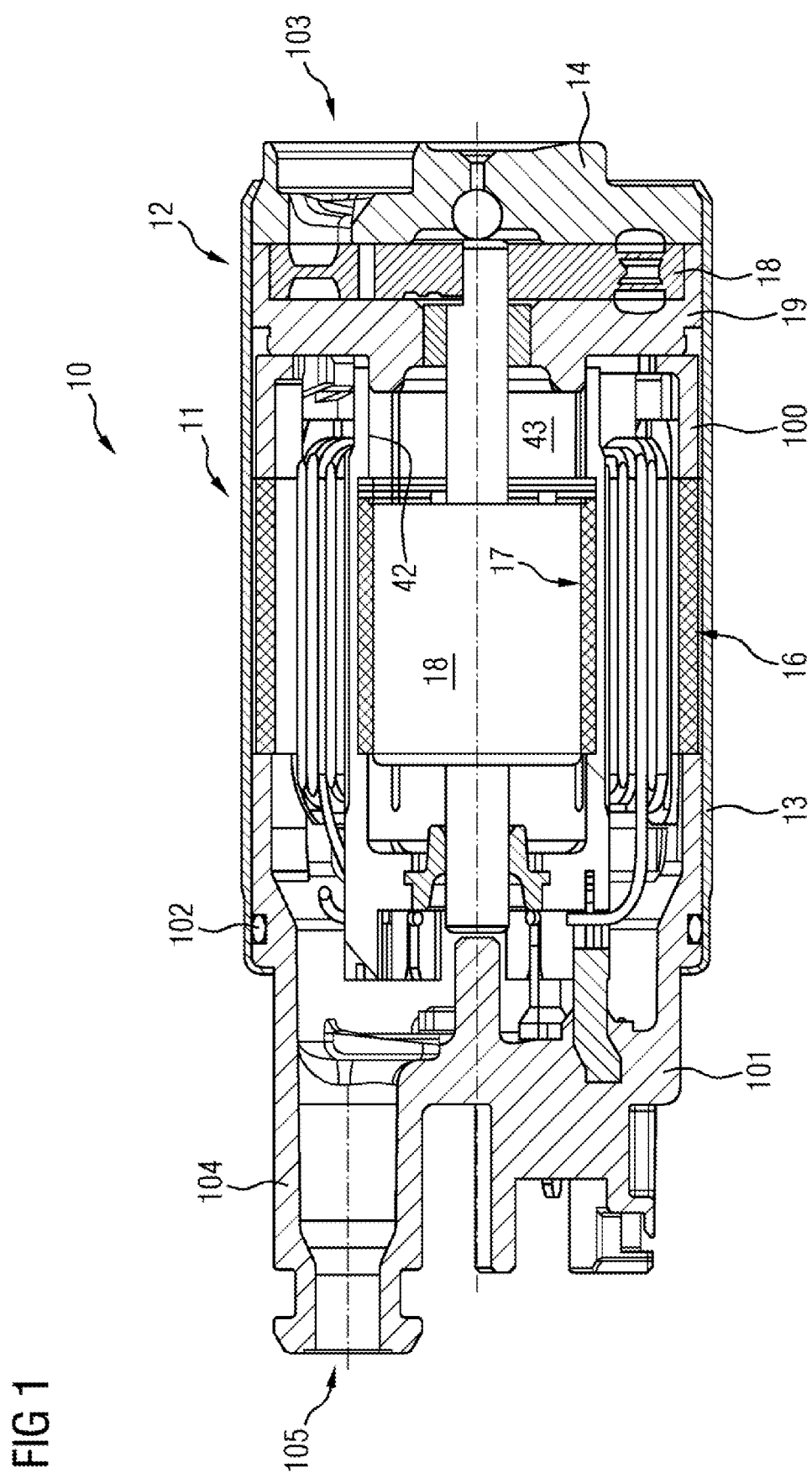
FIG. 1 is a sectional view through a fuel delivery assembly.
Figure 2:
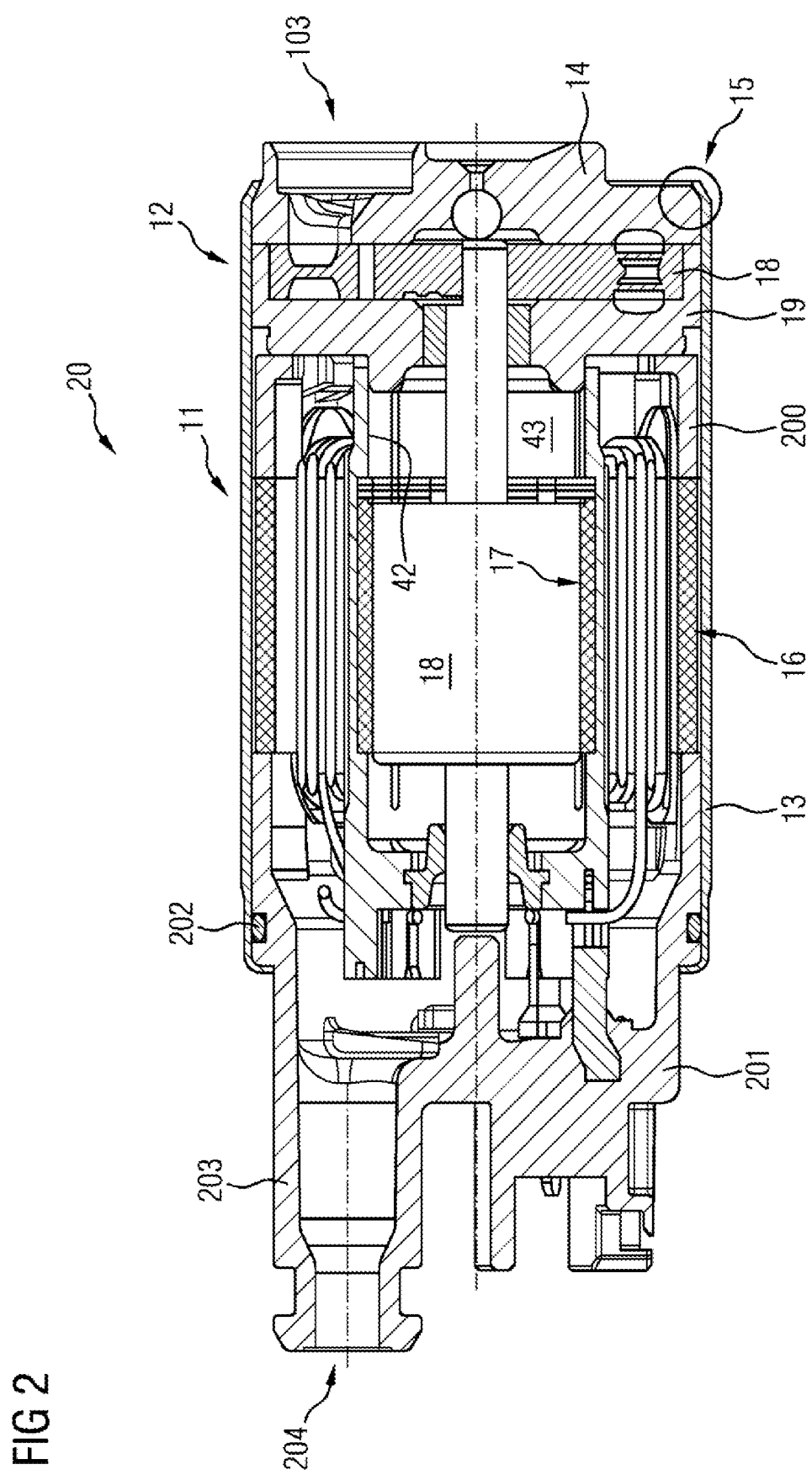
FIG. 2 is a sectional view through the fuel delivery assembly.

FIGS. 1 and 2 show a fuel delivery assembly 10 and 20 having an electric motor 11, a pump 12, which is a side-channel pump, and a sheet-metal casing 13 surrounding these. The pump 12 is closed with a cover 14 at its right-hand end.

The sheet-metal casing 13 is provided with a rolled portion 15 at its right-hand end (see FIG. 2). In the area of the rolled portion 15, the sheet-metal casing 13 is bent against the cover 14 in a closed encircling manner, such that said cover is confined by the rolled sheet-metal casing 13. As a result, the cover 14 can no longer be detached from the sheet-metal casing 13. For comparison, FIG. 1 shows the sheet-metal casing 13 before the rolling process.

The electric motor 11 has a first stator 16 and a second stator 17 arranged concentrically therein, and also a rotatably mounted rotor 18.

In addition to the cover 14, the pump 12 has a pump housing 19 and an impeller 18.

Figure 3:
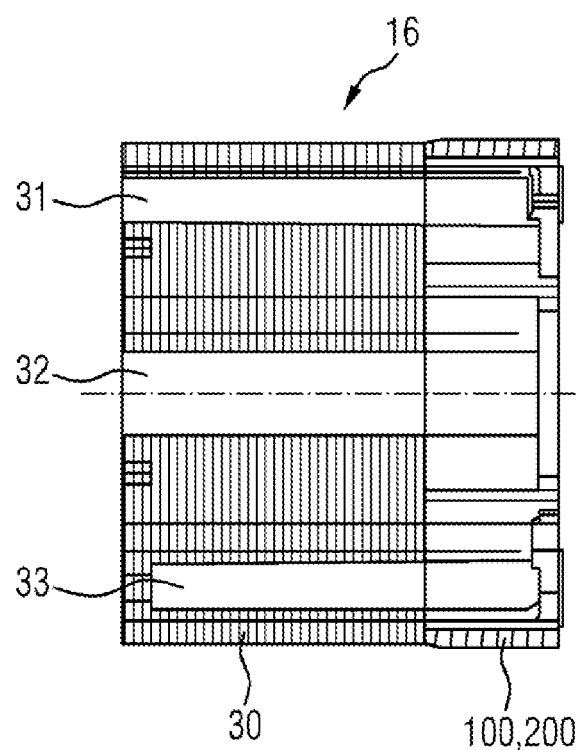
FIG. 3 is a sectional view through a first stator.

The first stator 16 is provided with a plastic extrusion coating that forms an encircling ring 100 (see FIG. 1) or 200 (see FIG. 2) between the first stator and the pump 12 or the pump housing 19. The encircling rings 100 and 200 are thus injection-molded onto the first stator 16 or onto a laminated core 30 of the first stator 16 (see FIG. 3). The laminated core 30 is assembled from several laminations arranged one behind the other. The laminations may have different thicknesses owing to the manufacturing process, such that the lengths of a plurality of laminated cores 30 may vary. The plastic extrusion coating in the form of the rings 100 and 200 can compensate for the manufacturing-related differences in length, since the total length of a composite composed of the first stator 16 and the ring 100 or 200 is defined by the dimensions of a cavity of an injection molding tool. Consequently, the total length of the composite is always consistent irrespective of the manufacturing-related differences in length of the laminated cores 30, such that the rolled portion 15 can likewise be produced with consistent quality.

The fuel delivery assemblies 10 and 20 differ with regard to the plastic extrusion coating of the first stator 16. In the case of the fuel delivery assembly 20, the plastic extrusion coating forms the ring 200 and a connection piece 201, such that the ring 200 and the connection piece 201 can be produced as a single piece by the plastic extrusion coating. By contrast, in the case of the fuel delivery assembly 10, the ring 100 and a connection piece 101 are two separate components.

Furthermore, a radial seal 102 in the form of an O-ring is installed between the connection pieces 101 and 201 and the sheet-metal casing 13.

The cover 14 is provided with an inlet opening 103 on the suction side, and the connection pieces 101 and 201 are provided with a connection piece 104 and 203, which has outlet openings 105 and 204, on the pressure side.

Figure 6:
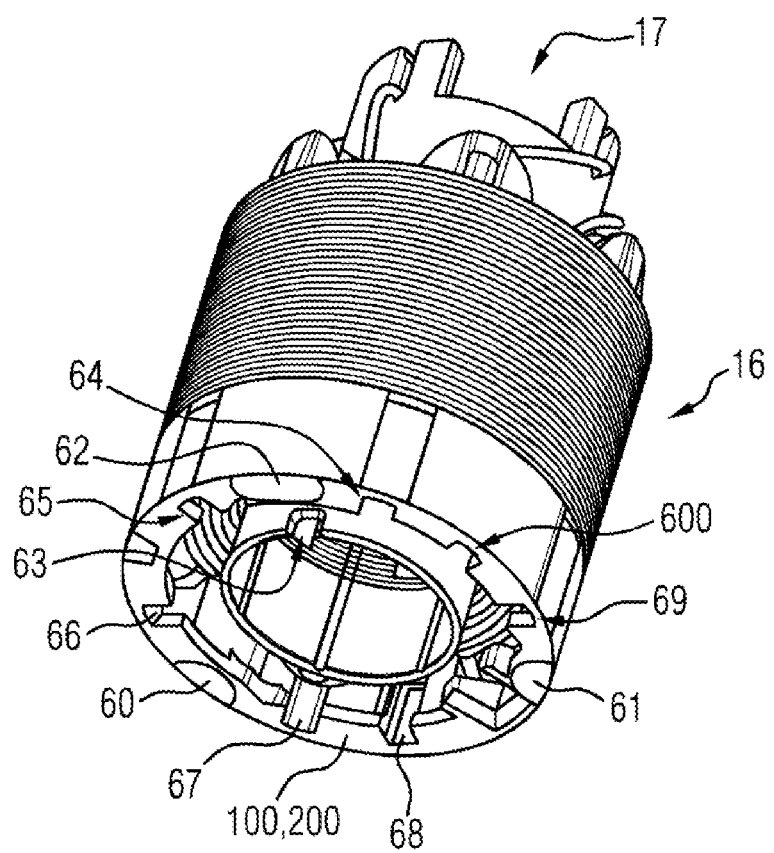
FIG. 6 is a first perspective plan view of the assembly from FIG. 5.

The rings 100 and 200 are provided with three support knobs 60, 61, and 62 which are arranged adjacent to one another at an angle of 120° (see FIG. 6). The support knobs 60, 61 and 62 contribute to statically determinate and thus wobble-free mounting of the rings 100 and 200 on the pump housing 19.

Furthermore, the plastics extrusion coating that constitutes the rings 100 and 200 forms webs 31, 32, and 33, which rest on the inside in the laminated core 30 of the first stator 16. The webs 31, 32, and 33 serve for reliably holding the rings 100 and 200 on the laminated core 30 (see FIG. 3). During the injection molding of the webs 31, 32, and 33, it is possible in particular for a very low-viscosity plastic melt to flow between laminations that form the laminated core 30, wherein the laminations are fixed in their position relative to one another.

Figure 4:
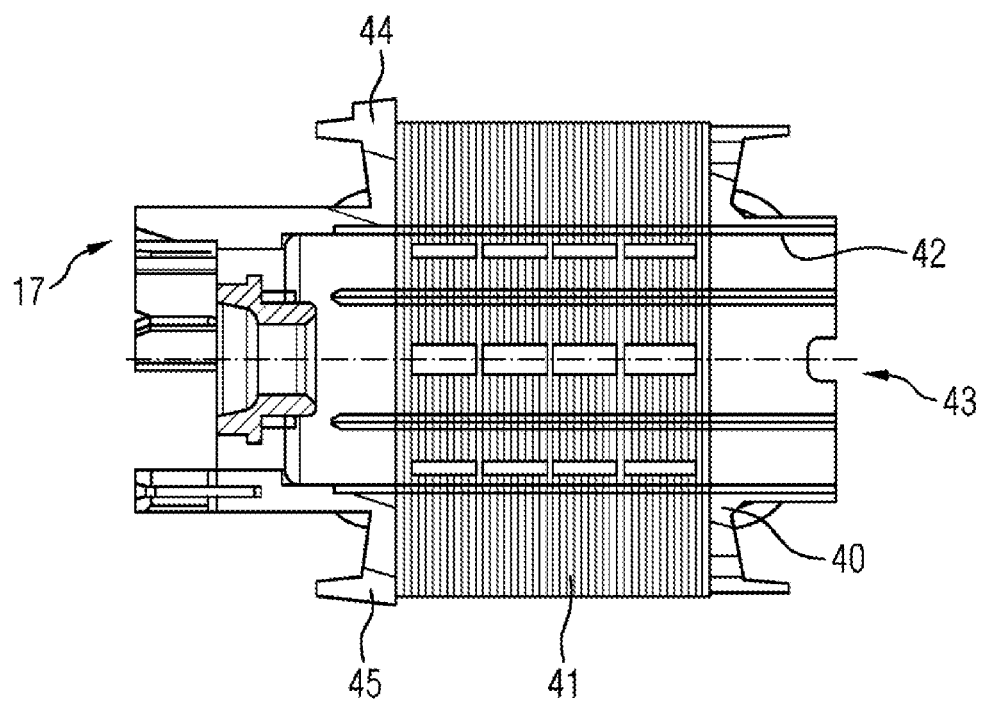
FIG. 4 is a sectional view through a second stator.
Figure 5:
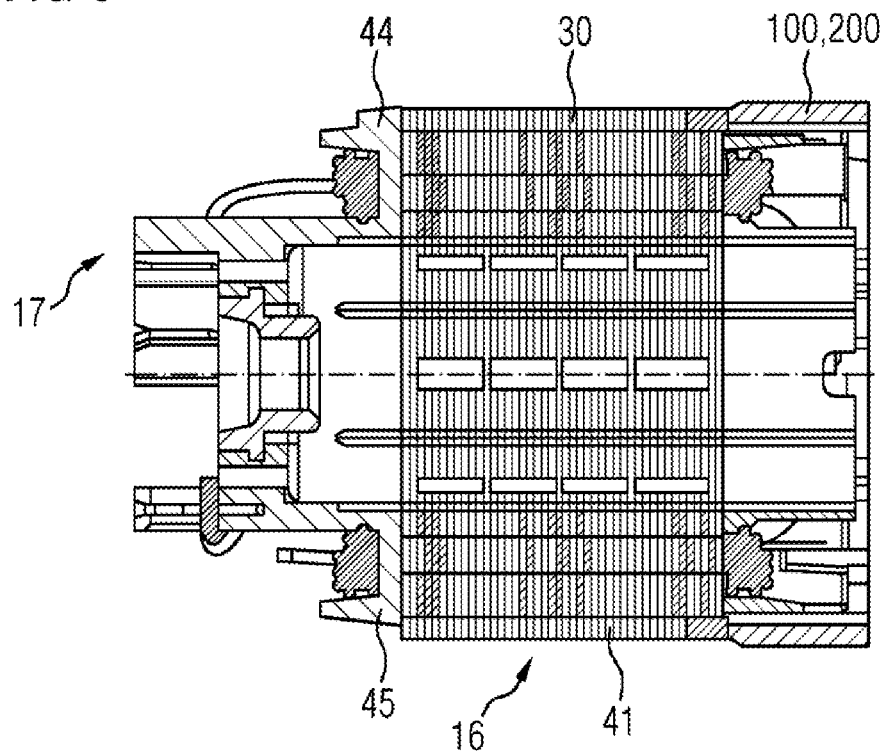
FIG. 5 is a sectional view through an assembly of the first stator from FIG. 3 and the second stator from FIG. 4.
Figure 7:
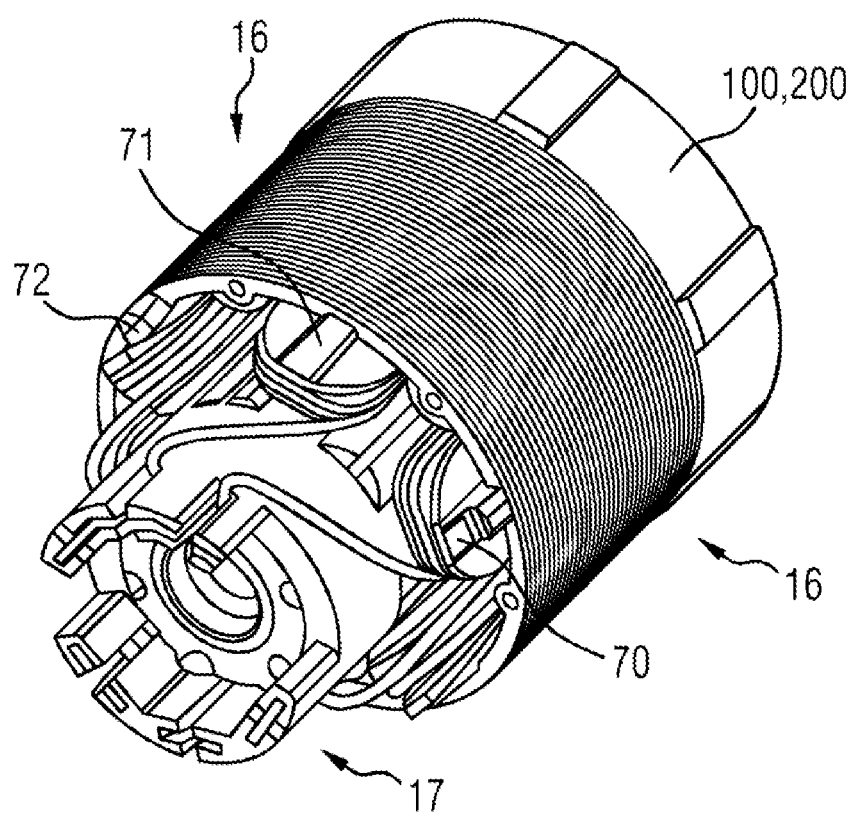
FIG. 7 is a second perspective plan view of the assembly from FIG. 5 from a viewing direction opposite to that in FIG. 6.

The second stator 17 is provided with a plastic extrusion coating 40 which surrounds a laminated core 41 (see FIG. 4). The plastic extrusion coating forms an inner lining 42 of a bore 43 that can receive and center the pump housing 19 (see FIGS. 1 and 2). The centering implemented by the bore 43 likewise makes a contribution to the statically determinate mounting of the rings 100 and 200 on the pump housing 19. In addition, the plastic extrusion coating forms detent-lug-like stop elements 44, 45 and a third stop element, not shown in FIG. 4, as well as 70, 71, and 72 (see FIG. 7). The second stator 17, as it is pushed into the first stator 16, abuts against the stop elements 44 and 45 or 70, 71, and 72 (see FIGS. 5 and 7).

The stator 17 is provided with a recess 63 (see FIG. 6) into which a projection (not shown) attached to the pump housing 19 can engage in order to lock the pump housing 19 and the stator 17 at a particular angle with respect to one another.

Furthermore, the stator 16 is provided with recesses 64, 65, 66, 67, 68, 69, and 600 (see FIG. 6) into which one or more projections (not illustrated) arranged on the pump housing 19 can engage in order to lock the pump housing 19 and the stator 16 at a particular angle with respect to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel delivery assembly, comprising:
    an electric motor having a first stator and a rotor;
    a pump;
    a sheet-metal casing formed by rolling that radially surrounds the electric motor and the pump;
    a suction-side inlet opening;
    a pressure-side outlet opening;
    a plastic coating which forms a ring at least partially encircling the first stator and arranged between the first stator and the pump; and
    a second stator provided with a respective plastic coating, which can be pushed into the first stator.

2. The fuel delivery assembly as claimed in claim 1, further comprising three support knobs acting in a pump longitudinal direction are attached to the plastic coating on a pump side.

3. The fuel delivery assembly as claimed in claim 1, wherein the respective plastic coating of the second stator forms an inner lining of a bore that contributes to the centering of a pump housing in the second stator.

4. The fuel delivery assembly as claimed in claim 1, wherein the second stator has at least one stop which, when the second stator is pushed into the first stator, abuts against the first stator.

5. The fuel delivery assembly as claimed in claim 4, further comprising: angular securing elements that secure the first stator and/or the second stator relative to a pump housing at a particular angle.

6. The fuel delivery assembly as claimed in claim 1, wherein the plastic extrusion coating forms the encircling ring at one end of the electric motor and also forms a connection piece, which has a connector, at an other end of the electric motor.

7. The fuel delivery assembly as claimed in claim 2, wherein the three support knobs are arranged adjacent to one another at an angle of 120°.

8. The fuel delivery assembly as claimed in claim 1, wherein the pump is one of a side-channel pump, a roller cell pump, a gerotor pump, or a screw pump.

9. The fuel delivery assembly as claimed in claim 6, further comprising: a radial seal arranged between the connection piece and the sheet-metal casing.

10. The fuel delivery assembly as claimed in claim 1, wherein the electric motor is a brushless direct-current motor.

11. A fuel delivery unit for use in a fuel tank of a vehicle, comprising:
    a fuel delivery assembly comprising:
        an electric motor having a first stator and a rotor;
        a pump;
        a sheet-metal casing formed by rolling that radially surrounds the electric motor and the pump;
        a suction-side inlet opening;
        a pressure-side outlet opening; and
        a plastic extrusion coating which forms a ring at least partially encircling the first stator and arranged between the first stator and the pump; and
        a second stator provided with a respective plastic coating, which can be pushed into the first stator.

* * * * *